April 4, 1944.  S. SCHNELL  2,345,634
BRAKE ACTUATING SYSTEM
Filed Sept. 30, 1942  2 Sheets-Sheet 1
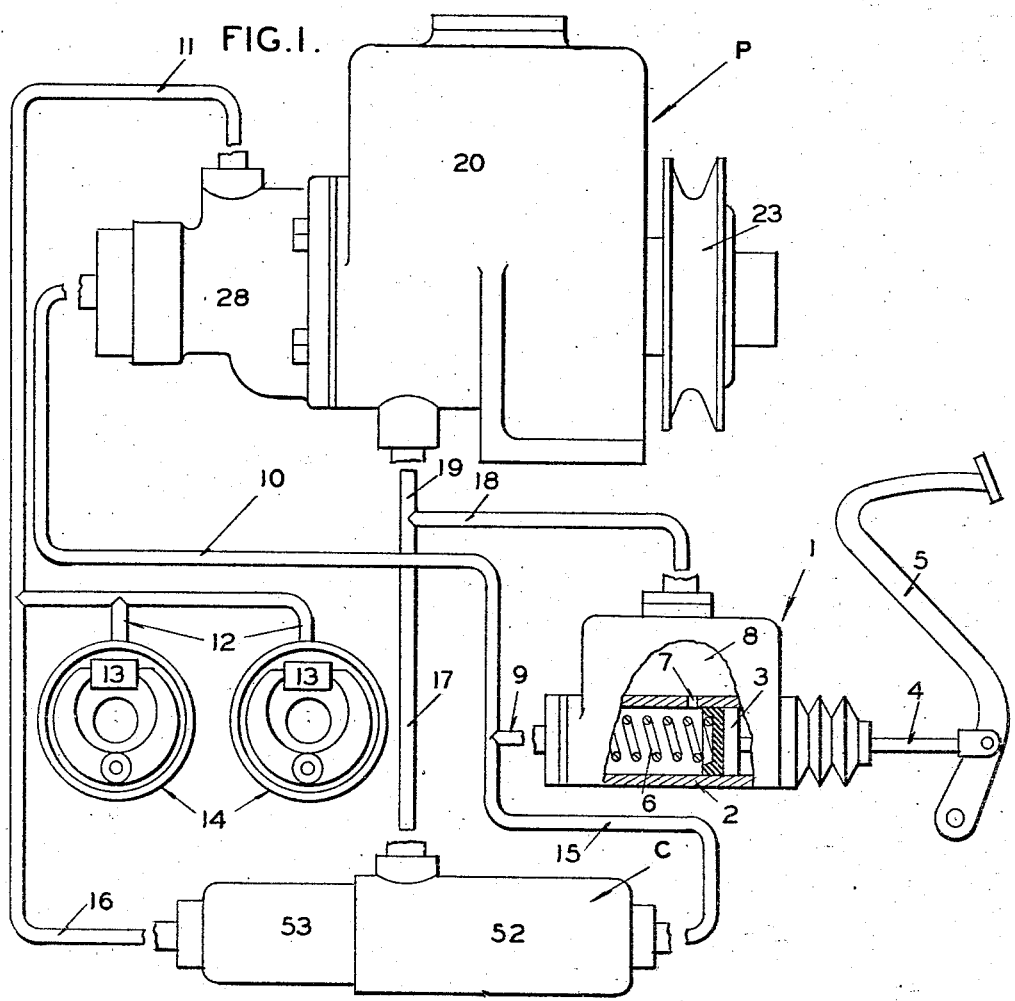
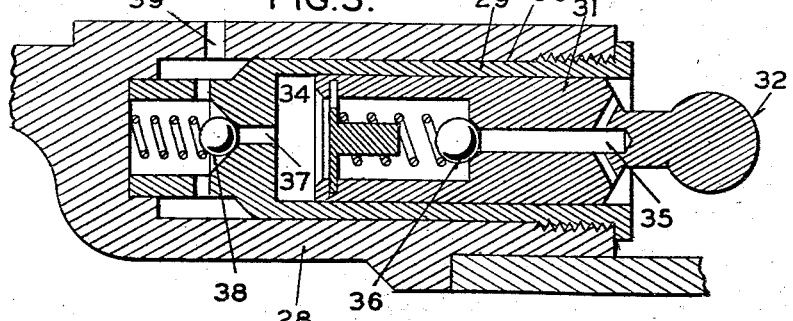
INVENTOR
S. SCHNELL
BY
ATTORNEY April 4, 1944.        S. SCHNELL        2,345,634
BRAKE ACTUATING SYSTEM
Filed Sept. 30, 1942            2 Sheets-Sheet 2
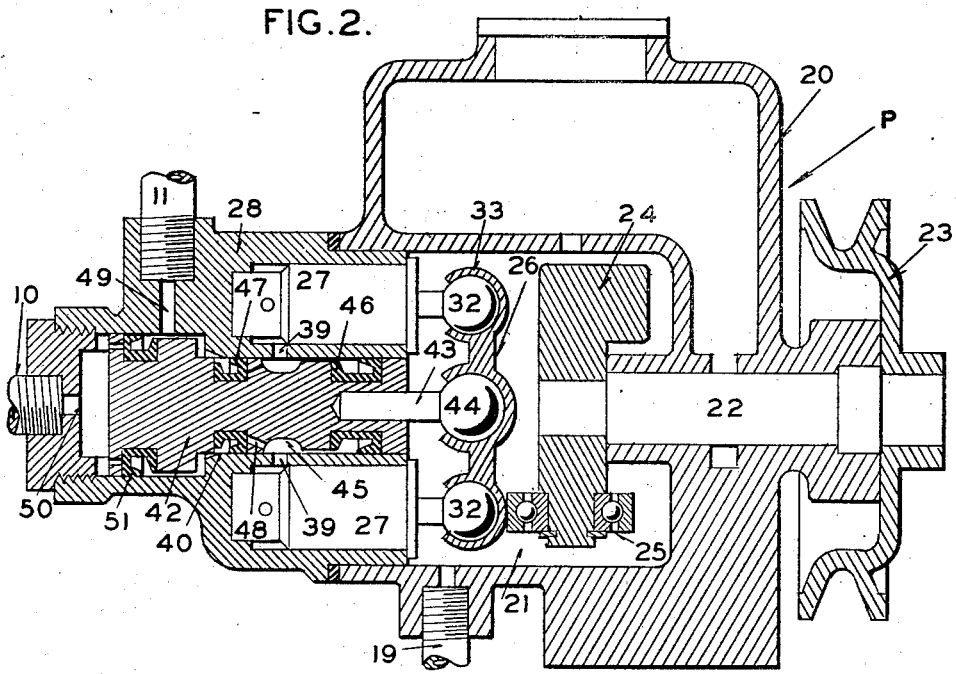
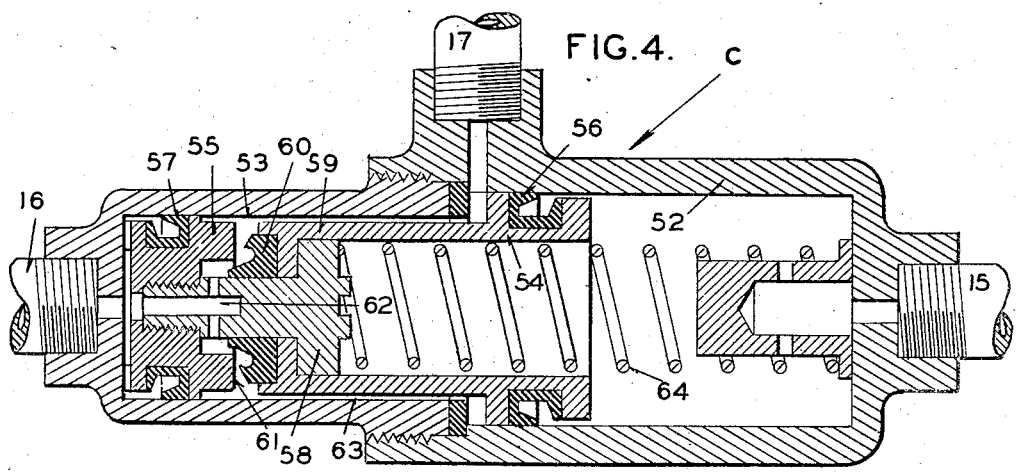
INVENTOR
S. SCHNELL
BY
ATTORNEY

UNITED STATES PATENT OFFICE 2,345,634

BRAKE ACTUATING SYSTEM

Steve Schnell, Kirkwood, Mo., assignor to Wagner Electric Corporation, St. Louis, Mo., a corporation of Delaware Application September 30, 1942, Serial No. 460,209

15 Claims. (Cl. 60—52)

My invention relates to a fluid pressure system and more particularly to one which can be employed for actuating brakes or like devices.

One of the objects of my invention is to produce an improved fluid pressure actuating system in which power developed fluid pressure is employed as the actuating medium and the magnitude of said fluid pressure is controlled by manually developed fluid pressure which is lower than the power developed fluid pressure.

Another object is to produce a fluid pressure actuating system of the type above referred to which will permit the decreasing of the actuating fluid pressure as established by the power fluid pressure developing means and the subsequent re-establishment thereof by the decreasing of said lower manually developed pressure and the subsequent re-establishment thereof, all without any additional operation of the power fluid pressure developing means.

A still further object of my invention is to produce an improved fluid pressure actuating system which has so associated therewith a power driven pump and a manually-operated master cylinder device that the system can be efficiently controlled as desired with a small manual effort and a minimum of pump operation.

Other objects of my invention will become apparent from the following description taken in connection with the accompanying drawings in which Figure 1 is a schematic view of a fluid pressure actuating system in which my invention is embodied; Figure 2 is a sectional view showing details of the pump; Figure 3 is an enlarged sectional view of one of the pumping units; and Figure 4 is an enlarged sectional view of the pressure control valve.

Referring to the drawings in detail and first to Figure 1, there is disclosed a fluid pressure actuating system for operating brakes but it is to be understood that such a system can be employed to operate any apparatus desired. Shown in Figure 1 is a master cylinder device 1 having a cylinder 2 in which is reciprocable a piston 3 connected by a piston rod 4 to a pedal 5. The piston is normally biased to its inoperative position by a spring 6 and when in this position it uncovers a porthole 7 for placing the cylinder ahead of the piston in communication with a reservoir 8. The outlet conduit 9 of the master cylinder device is connected by a branch conduit 10 to the control means of a power driven pump P shown in detail in Figures 2 and 3. The outlet of this pump is connected by a conduit 11 and branch conduits 12 to motors 13 for actuating brake assemblies 14. A second branch conduit 15 leads from the outlet conduit 9 of the master cylinder device to a pressure control valve means generally indicated by the letter C and illustrated in detail in Figure 4. There is also provided a conduit 16 for connecting this valve C to the fluid motors 13 of the brake assemblies. A conduit 17 is employed to connect conduit 16 through the valve C with branch conduits 18 and 19, the former leading to reservoir 8 of the master cylinder device and the latter to the reservoir embodied in pump P.

Referring now to Figures 2 and 3, the pump P is of the swash plate type and comprising a casing 20 having therein the reservoir 21 which is connected with the previously mentioned branch conduit 19. Journaled in casing 20 is a driving shaft 22 having secured to its outer end a pulley 23 whereby the shaft may be driven from a suitable source of power, as, for example, an electric motor or a vehicle driving engine. The inner end of the shaft is provided with a pump driving member 24 which has mounted thereon a ring 25 rotatable upon an axis at right angles to the axis of shaft 22. This ring is adapted to co-operate with the swash plate 26 whereby the various pumping units 27 may be operated. These pumping units are positioned in a casing 28 attached to casing 20 and arranged in circumferentially spaced relation about an axis coinciding with the axis of shaft 22.

One of the identical pumps 27 is shown in detail in Figure 3 and comprises a cylinder 29 fitted into a bore 30 in casing 28. Reciprocable within the cylinder is a piston 31 having a ball 32 forming part of a ball and socket connection 33 with the peripheral portion of the swash plate. The compresssion chamber 34 of the pumping unit has an inlet passage 35 in piston 31, said passage being controlled by a check valve 36. The outlet passage 37 for the compression chamber is also controlled by a check valve 38.

Each of said outlet passages 37 of the pumping units communicates with a passage 39 which leads to a stepped bore 40 in casing 28. This bore is axially aligned with the driving shaft 22 and has positioned therein a two-diameter piston 42 carrying a pin 43 upon which the center of swash plate 26 is mounted by means of a ball and socket connection 44. The smaller portion of the piston is provided with an annular recess 45 on opposite sides of which are positioned packing cups 46 and 47, packing cup 46 preventing fluid from flowing into reservoir 21 of the pump and packing cup 47 being so arranged that fluid can flow therepast from recess 45 to the large end of bore 40, there being openings 48 to facilitate such flow.

The large end of the bore communicates with an outlet passage 49 connected with the previously referred to conduit 11 which leads to the fluid motors of the brakes. This large portion of the bore is also provided with an inlet passage 50 to which is connected the previously referred to conduit 10 coming from the master cylinder device. The large end of piston 42 is provided with a packing cup 51 so positioned that when fluid passes from the pump units to conduit 11, fluid will be prevented from flowing to the inlet passage 50. However, the packing cup is so arranged that its lip can collapse and permit fluid to flow from the inlet passage 50 to the outlet passage 49 and the brake fluid motors in the event the pressure of the incoming fluid from the master cylinder device is greater than the fluid pressure in the fluid motors, that is, if the fluid pressure on the left side of the packing cup 51 is greater than that on the right side, then fluid can pass the cup. If the reverse is true, there can be no passage of fluid past the cup in either direction.

Referring now to Figure 4, the control valve means C is embodied in two axially aligned cylinders 52 and 53 of different sizes. The outer end of the large cylinder 52 is connected to communicate with the previously referred to conduit 15 coming from the master cylinder device and the outer end of the smaller cylinder 53 is connected to communicate with the previously referred to conduit 16 leading to the brake fluid motors. Within the cylinders are two pistons 54 and 55 provided with packing cups 56 and 57. The smaller piston 55 is provided with an extension 58 for cooperation with a cylindrical extension 59 on the large piston 54. These extensions are so arranged as to limit the extent of separation of the pistons. Associated with extension 59 is an annular valve element 60 which is adapted to cooperate with an annular valve seat 61 carried by piston 55. When the pistons are at their limit of separation, the valve element 60 will be unseated, thus permitting communication from conduit 16 through a passage 62 in piston 55 to a chamber 63 between the pistons and surrounding extension 59. This chamber constantly communicates with the previously referred to conduit 17 leading to reservoir 8 of the master cylinder device and the pump reservoir. A spring 64 of predetermined strength is interposed between extension 58 on piston 55 and the outer end of cylinder 52 to thus bias piston 55 against the outer end of its cylinder. When this smaller piston is in its biased position, the large piston 54 will be slightly spaced from the inner end of its cylinder.

Referring now to the operation of the fluid pressure actuating system, all the parts thereof will be in the positions shown when the system is inoperative. Under these conditions both reservoirs will be filled with fluid as will all the conduits. If it is now desired to operate the system, the master cylinder 1 is operated by actuating pedal 5. As the master cylinder piston 3 moves forwardly, porthole 7 will be cut off and fluid pressure will begin to be developed by the master cylinder. This fluid pressure will be effective on piston 54 in the valve means C and cause it to be moved to the left, thereby seating valve element 60 and disconnecting conduit 16 and the fluid motors from the reservoirs of the pump and master cylinder.

The fluid pressure developed by the master cylinder will also be effective on the large end of the two-diameter piston 42 of the pump and will move this piston to the right. Some fluid under pressure will also pass the packing cup 51 and enter conduit 11 and the brake fluid motors since the fluid on the right side of cup 51 is at atmospheric pressure. This slight pressure will be effective in bringing the brake assemblies into contact with the drum. Movement of the two-diameter piston 42 to the right will result in moving the central pivot of the swash plate 26 of the pump toward the right and thus slightly tilt the swash plate. When this occurs, ring 25 on the actuating member 24 for the pumping units will become effective in causing the swash plate to wobble back and forth, thereby reciprocating pistons 31 of the various pumping units, all in a well-known manner. As these pistons of the pumping units reciprocate, fluid will be drawn into their compression chambers and after being compressed, forced out through passages 39 past the packing cup 40 and then through conduit 11 to the brake actuating motors 13.

If it is assumed that the ratio of the effective pressure areas of the two-diameter piston 42 is two to one and the ratio of the effective pressure areas of the two pistons 54 and 55 is also two to one, it is obvious from the arrangement that the pumping units 27 will produce in the fluid motors 13 twice the pressure developed by the master cylinder. When this pump developed pressure is slightly exceeded, the forces acting upon the two-diameter piston 42 will be such that piston 42 will be forced to the left. This will cause the pump to automatically cease pumping since the swash plate will assume the position where it can no longer be wobbled and the ring will run freely around the surface adjacent the periphery of the swash plate. It is thus seen that by the manual development of a predetermined pressure by the master cylinder device, a larger pressure can be caused to be effective in the actuating fluid motors as a result of the operation of the pump. The pump will always cease to operate whenever the fluid pressure developed thereby becomes approximately twice the value of the master cylinder developed pressure due to the ratios of the pistons assumed. During the pumping operation the valve 60 will always remain seated and due to the two to one ratio between pistons 54 and 55, piston 55 will remain at the outer end of its cylinder.

If it is desired to release some of the fluid pressure effective in the fluid motors, this can be accomplished by merely permitting the master cylinder piston 3 to be partially retracted. This will cause a drop in pressure in the master cylinder and also in cylinder 52 of the valve means C. The force acting upon piston 55 and created by the pressure in the fluid motors will now be effective to move both pistons 55 and 54 to the right with the valve element 60 closed. As these two pistons move to the right, there will be a drop in the pressure in the fluid effective in the fluid motors since the volume of the system in which this fluid is confined is increased. The ratio between the fluid pressure in the fluid motors 13 and in the master cylinder will remain the same, that is, approximately two to one, neglecting, of course, the effect of the spring 64, which is relatively weak, and the pressure necessary to overcome cup friction.

If it is desired to again increase the fluid pressure in the fluid motor to its value as established by the operation of the pump, this can be accomplished by merely moving the piston of the master cylinder forwardly and re-developing the same fluid pressure which it was necessary to develop to obtain the original pump established fluid pressure in motors 13. The pump need not operate. Thus if there were originally established in the fluid motors a pressure of two hundred pounds as a result of pump operation, this can be restored by merely re-developing one hundred pounds of pressure in the master cylinder which was the pressure required to cause the pump to operate and place the two hundred pounds in the fluid motor. As the master cylinder fluid pressure is again developed, pistons 54 and 55 of the valve C would move to the left and act as compounding pistons. When piston 55 abuts the outer end of its cylinder, the original established pressure of two hundred pounds will again be effective in the fluid motors. It is to be noted that when the pressure in the fluid motor is being re-established, there will be no movement of the two-diameter piston 42 because under such conditions the forces acting upon piston 42 will remain balanced due to the fact that the ratio of the fluid pressures acting upon the piston will remain the same.

If, after the original pump established fluid pressure in the motors is reached, it is desired to place additional pressure in the fluid motors, this, of course, can be done by merely developing additional pressure by the master cylinder device which will again bring the pump into operation and thereby increase the fluid pressure in the motors.

When it is desired to completely release the brakes, the piston of the master cylinder device may be permitted to be fully retracted so that porthole 7 will be uncovered. When this occurs, fluid pressure in the master cylinder and cylinder 52 of the valve means C will drop to atmospheric pressure. Since there will now be no pressure acting upon piston 54 to maintain the valve element 60 seated, this valve element will be forced off its seat by the pressure from the fluid motors. When the valve element is unseated, the fluid motors will be in communication with both reservoirs and the fluid under pressure will be immediately relieved and excess fluid returned to the reservoirs. After fluid pressure is relieved in the fluid motors, spring 64 will return the two pistons 54 and 55 to their inoperative positions as shown in Figure 4.

It need not be necessary to return the master cylinder piston entirely to its retracted position before the brakes can be fully released. Whenever the master cylinder piston reaches a retracted position where the fluid pressure in cylinder 52 is no longer sufficiently effective to prevent the separating movement of the piston, then the valve element 60 will be unseated and fluid under pressure can be released to the reservoir. In this connection it is to be noted that spring 64 acts to decrease the fluid pressure effective in holding piston 55 toward valve-seated position. The spring 64 is so proportioned that pressure release upon the return movement of the master cylinder piston will not occur until the pressure in the fluid motors is just great enough to hold the brake shoes in firm contact with the drum. However, it can be varied as desired by varying the strength of spring 64.

In the event of failure of the pump, the system can, nevertheless, be operated since the master cylinder developed pressure will by-pass cup 51 and reach the motors. The motor pressures, however, will be the same as the master cylinder developed pressure. The pressure will be released when the master cylinder piston is retracted. During the releasing operation it is to be noted, however, that the pistons 54 and 55 will not move to the right until the pressure in cylinder 52 drops to one-half of the motor pressure.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a fluid motor, power-operated means for establishing fluid pressure in the motor, means for controlling the fluid pressure established in the motor by a proportionally lower manually developed fluid pressure, and means comprising a compounding device for manually varying the motor fluid pressure by varying the manually developed fluid pressure to values not exceeding the manually developed fluid pressure corresponding to that established in the motor by the power-operated means.

2. In a fluid pressure system, a fluid motor, power-operated means for establishing fluid pressure in the motor, means for controlling the fluid pressure established in the motor by a proportionally lower manually developed fluid pressure, and means for lowering and re-establishing the motor fluid pressure when the manually developed fluid pressure is lowered and then re-established to the manually developed fluid pressure corresponding to that established in the motor by the power-operated means, said last named means comprising two simultaneously movable pistons, the smaller of which is acted upon by the motor fluid pressure and the larger of which is acted upon by the manually developed fluid pressure.

3. In a fluid pressure system, a fluid motor, power-operated means for establishing fluid pressure in the motor, means for controlling the fluid pressure established in the motor by a proportionally lower manually developed fluid pressure, and means for manually varying the motor fluid pressure by varying the manually developed fluid pressure to values not exceeding the manually developed fluid pressure corresponding to that established in the motor by the power-operated means, said last named means comprising two simultaneously movable pistons, the smaller of which is acted upon by the motor fluid pressure and the larger of which is acted upon by the manually developed fluid pressure, means for limiting the movement of the pistons by pressure acting upon the larger piston and a spring for biasing at least one of the pistons to said limiting position.

4. In a fluid pressure system, a fluid motor, power-operated means for establishing fluid pressure in the motor, means for controlling the fluid pressure established in the motor by a proportionally lower manually developed fluid pressure, means comprising a compounding device for lowering and re-establishing the motor fluid pressure when the manually developed fluid pressure is lowered and then re-established to the manually developed fluid pressure corresponding to that established in the motor by the power-operated means, and means for establishing manually developed fluid under pressure in the motor in the event of failure of the power-operated means.

5. In a fluid pressure system, power-operated means for developing fluid pressure, manually-operated means for developing fluid pressure, a motor for actuating a device, conduit means for connecting the power-operated means to the motor, a check valve for the conduit means, means for causing the power-operated means to develop fluid pressure in the motor which is proportionally higher than the fluid pressure developed by the manual means when operated, and means comprising a compounding device for decreasing and re-establishing the fluid pressure effective in the motor by decreasing the manually developed fluid pressure and re-establishing it to the value prior to the decrease.

6. In a fluid pressure system, power-operated means for developing fluid pressure, manually-operated means for developing fluid pressure, a motor for actuating a device, conduit means for connecting the power-operated means to the motor, means for causing the power-operated means to develop fluid pressure in the motor which is proportionally higher than the fluid pressure developed by the manual means when operated, and means comprising a compounding device for varying the fluid pressure in the motor below the value established by the power-operated means solely by proportionally varying the fluid pressure developed by the manually-operated means below that required to establish the fluid motor pressure.

7. In a fluid pressure actuating system, a fluid motor, a power-operated fluid pressure pump having its outlet communicating with the motor, a master cylinder device, means controlled by the fluid pressure developed by the master cylinder device to cause said pump to develop fluid pressure effective in the motor which is proportionally greater than that developed by the master cylinder device, and means associated with the fluid motor and the master cylinder device for lowering the fluid pressure which has been made effective in the fluid motor by the pump by lowering the fluid pressure developed by the master cylinder to establish said effective pressure in the motor, said last named means embodying means re-establishing the same fluid pressure effective in the motor as developed by the pump by increasing the master cylinder developed pressure to its prior value, said pump being inoperative during the lowering and re-establishment of said motor fluid pressure.

8. In a fluid pressure actuating system, a fluid motor, a power-operated fluid pressure pump having its outlet communicating with the motor, a master cylinder device, means controlled by the fluid pressure developed by the master cylinder device to cause said pump to develop fluid pressure effective in the motor which is proportionally greater than that developed by the master cylinder device, and means associated with the fluid motor and the master cylinder device for lowering the fluid pressure which has been made effective in the fluid motor by the pump by lowering the fluid pressure required to be developed by the master cylinder to establish said effective pressure in the motor, said last named means embodying two pistons of different sizes with the smaller piston being acted upon by the motor fluid pressure and the larger piston being acted upon by the master cylinder fluid pressure.

9. In a fluid pressure actuating system, a fluid motor, a power-operated fluid pressure pump having its outlet communicating with the motor, a master cylinder device, means controlled by the fluid pressure developed by the master cylinder device to cause said pump to develop fluid pressure effective in the motor which is proportionally greater than that developed by the master cylinder device, and means for controlling the motor fluid pressure comprising two pistons of different diameters, means for subjecting the smaller piston to the fluid pressure in the motor, means for subject the larger piston to the master cylinder developed pressure and means for limiting the extent of movement of the pistons by fluid pressure acting upon the larger piston.

10. In a fluid pressure actuating system, a fluid motor, a power-operated fluid pressure pump having its outlet communicating with the motor, a master cylinder device having a reservoir, means controlled by the fluid pressure developed by the master cylinder device to cause said pump to develop fluid pressure effective in the motor which is proportionally greater than that developed by the master cylinder device, means for controlling the motor fluid pressure comprising two pistons of different diameters having relative movement, means for subjecting the smaller piston to the fluid pressure in the motor, means for subjecting the larger piston to the master cylinder developed pressure and means for limiting the extent of movement of the pistons by fluid pressure acting upon the larger piston, and means comprising valve means controlled by relative movement of the pistons for placing the fluid motor in communication with the master cylinder reservoir.

11. In a fluid pressure actuating system, a fluid motor, a power-operated fluid pressure pump having its outlet communicating with the motor, a master cylinder device having a reservoir, means controlled by the fluid pressure developed by the master cylinder device to cause said pump to develop fluid pressure effective in the motor which is proportionally greater than that developed by the master cylinder device, means associated with the fluid motor and the master cylinder device for lowering the fluid pressure which has been made effective in the fluid motor by the pump by lowering the fluid pressure required to be developed by the master cylinder to establish said effective pressure in the motor, said last named means embodying means for reestablishing the same fluid pressure effective in the motor as developed by the pump by increasing the master cylinder developed pressure to its prior value, and means for connecting the fluid motor to the reservoir when the master cylinder developed pressure is lowered below a predetermined pressure.

12. In a fluid pressure actuating system, a fluid motor, a power-operated fluid pressure pump provided with a reservoir and having its outlet communicating with the motor, a master cylinder device having a reservoir, means controlled by the fluid pressure developed by the master cylinder device to cause said pump to develop fluid pressure effective in the motor which is proportionally greater than that developed by the master cylinder device, means associated with the fluid motor and the master cylinder device for lowering the fluid pressure which has been made effective in the fluid motor by the pump by lowering that fluid pressure required to be developed by the master cylinder to establish said effective pressure in the motor, said last named means embodying means for re-establishing the same fluid pressure effective in the motor as developed by the pump by increasing the master cylinder developed pressure to its prior value all without any additional pump operation, and means comprising valve means for connecting the fluid motor to both reservoirs when the master cylinder developed pressure is lowered below a predetermined pressure.

13. In a fluid pressure actuating system, a fluid motor, a power-operated fluid pressure pump having its outlet communicating with the motor, a master cylinder device, means controlled by the fluid pressure developed by the master cylinder device to cause said pump to develop fluid pressure in the motor which is proportionally greater than that developed by the master cylinder device, and means for varying the motor fluid pressure below the pressure established therein by the pump when the fluid pressure from the master cylinder device is varier below the pressure developed thereby which caused said pump established motor fluid pressure, said means comprising two axially aligned pistons of different diameters with the larger acted upon by the pressure from the master cylinder and the smaller acted upon by the fluid pressure in the motor and functioning to transmit force only when the fluid pressure developed by the master cylinder device is varied.

14. In a fluid pressure actuating system, a fluid motor, a power-operated pump having its outlet communicating with the motor, a master cylinder device, a piston operated by fluid pressure developed by the master cylinder device for causing said pump to operate, means acting upon said piston for causing said pump to discontinue to operate when the fluid pressure developed thereby and effective in the motor is a value greater by a predetermined ratio than that developed by the master cylinder device, and means comprising a compounding device for varying the motor fluid pressure proportionally to the master cylinder developed pressure when said master cylinder pressure is varied below its developed pressure corresponding to the motor pressure developed by the pump.

15. In a fluid pressure actuating system, a fluid motor, a power-operated pump having its outlet communicating with the motor, a master cylinder device, a piston operated by fluid pressure developed by the master cylinder device for causing said pump to operate, means acting upon said piston for causing said motor to discontinue to operate when the fluid pressure developed thereby and effective in the motor is a value greater by a predetermined ratio than that developed by the master cylinder device, means for varying the motor fluid pressure proportionally to the master cylinder developed pressure when said master cylinder pressure is varied below its developed pressure corresponding to the motor pressure developed by the pump, and by-pass means for the piston allowing fluid pressure developed by the master cylinder to enter the motor when the pressure in the motor is below said master cylinder developed pressure.

STEVE SCHNELL.